United States Patent
Kimio et al.

[15] 3,681,582
[45] Aug. 1, 1972

[54] AUTOMATIC SIZING DEVICE WITH LINEAR SCALE

[72] Inventors: Kanou Kimio, Oobushi; Nakamura Keiichi, Kariya, both of Japan

[73] Assignee: Toyoda Koki Kabushiki Kaisha, Kariya-shi, Aichi-ken, Japan

[22] Filed: Nov. 3, 1970

[21] Appl. No.: 86,560

[30] Foreign Application Priority Data

Nov. 8, 1969 Japan..........................44/89415

[52] U.S. Cl............235/151.32, 33/143, 235/92 DN
[51] Int. Cl..............................G01b 7/12, G06f 7/46
[58] Field of Search... 235/92 EV, 92 CA, 92 DN, 92 MT, 235/151.32; 33/143 L, 147 N, 166, 172 E, 178 E

[56] References Cited

UNITED STATES PATENTS

| | | |
|---|---|---|
| 3,476,481 | 11/1969 | Lemelson...................33/143 X |
| 3,276,131 | 10/1966 | Hahn..........................33/147 N |
| 3,142,121 | 7/1964 | Stefanov...................235/92 DN |
| 3,103,072 | 9/1963 | Golley et al.................33/143 L |
| 3,546,440 | 12/1970 | Fawcett, Jr. et al......235/92 CA |
| 3,528,002 | 9/1970 | Dunlavey.................33/143 L X |

*Primary Examiner*—Eugene G. Botz
*Assistant Examiner*—Edward J. Wise
*Attorney*—Berman, Davidson and Berman

[57] ABSTRACT

A sizing device having a reading head whose scale is moved linearly in accordance with relative displacement of a pair of measuring feelers simultaneously moved in opposite direction so as to be brought into diametric contact with a workpiece. Signals transmitted from the reading head are applied to a reversible counter which calculates the span between the feelers and whose count is compared by a comparator with a desired size stored in a register. The comparator generates a sizing signal at its output when the size of the span between the feelers accords with the desired size and this size is digitally indicated on an indicator.

4 Claims, 8 Drawing Figures

Fig. 1

INVENTORS.
KIMIO KANOU,
KEIICHI NAKAMURA,
BY
Berman, Davidson & Berman
ATTORNEYS

AUTOMATIC SIZING DEVICE WITH LINEAR SCALE

BACKGROUND OF THE INVENTION

The present invention relates to precision sizing devices, and more particularly to a sizing device which automatically measures and digitally indicates sizes of a workpiece being worked on, and which provides a sizing signal when the size of the workpiece accords with a desired size preset in accordance with information stored in a record.

Precision sizing devices of the automatic in-process gauge type are becoming more prevalent in accordance with the spread of grinding machine tools employing numerically control systems. In the aforementioned type, prior to a sizing operation, a pair of measuring feelers are automatically moved by motors to predetermined sizing positions necessary to measure diameters of a workpiece in accordance with gauge size setting information stored in a permanent record such as a punched tape. Sizing signals indicating when the workpiece has been ground to the desired sizes are generated by detecting means, for example a pneumatic orifice device or a differential transformer device, mounted on a measuring feeler. Thus, the aforementioned sizing devices have enabled operation over a wide range of sizes and therefore are adapted for measuring a series of stepped diameters of a cylindrical workpiece without recalibration.

In the operation of the feelers, however, usually a pair of feelers are moved to the predetermined sizing positions by motors through gearing and a screw-feeding mechanism each time a new gauge size setting information is ordered to the motor. Therefore, it is extremely essential that the feeding mechanism for the measuring feelers be very precise so that the setting accuracy of the measuring feelers will not be affected by mechanical errors occurring in the setting operation. Besides, it has been difficult to absolutely and digitally indicate the current size of the workpiece to be ground because analogue devices, such as the pneumatic orifice device or the differential transformer device, are not electrically associated with the control system for the setting operation of the measuring feelers.

SUMMARY OF THE INVENTION

It is, therefore, an object of the present invention to provide a sizing device which linearly measures and digitally indicates diameters of a workpiece over a wide range of sizes without requiring setting operations of a pair of measuring feelers.

It is another object of the present invention to provide a sizing device with a reversible counter in which miscounts occurring during a sizing operation are corrected and are not accumulated in following sizing operations.

It is another object of the present invention to provide a sizing device which is constructed in such a way that its reading device is capable of linearly reading a scale directly moved in accordance with the relative displacement of feelers.

According to the present invention, there is provided a sizing device which comprises a sizing head, a pair of feed rods slidably supported on the sizing head, feed means for axially moving the pair of feed rods in opposite directions, a pair of measuring feelers individually secured to the feed rods to measure a span therebetween, and comparator means to produce a sizing signal. Furthermore, a scale member is mounted on one of the pair of feed rods and parallel thereto. On the other of the pair of feed rods is mounted a reading device which linearly reads the scale member as it is being directly moved in accordance with the relative displacement of the measuring feelers. A counting device counts the size of the span between the feelers in response to the signals transmitted from the reading device. An indicator is connected to the counting means for digitally indicating the size of the span between the feelers. A register stores a desired size signal provided from information that is stored in a permanent record such as a punched tape. The aforementioned comparator means is connected to the register and the counting device for comparing the size of the feeler span with the desired size and generates said sizing signal when the size of the feeler span accords with the desired size.

In the aforementioned construction, since the reading device is capable of linearly measuring the scale over a wide range of sizes as it is being directly moved in accordance with the relative displacement of the feelers, it is not necessary to mechanically preset the feeler span in accordance with the gauge size setting information prior to the following sizing operation.

BRIEF DESCRIPTION OF THE DRAWINGS

The foregoing and other objects of the present invention will become fully apparent from the following description of a preferred embodiment of the present invention with reference to the accompanying drawings, in which.

DESCRIPTION OF A PREFERRED EMBODIMENT

Figure 1:
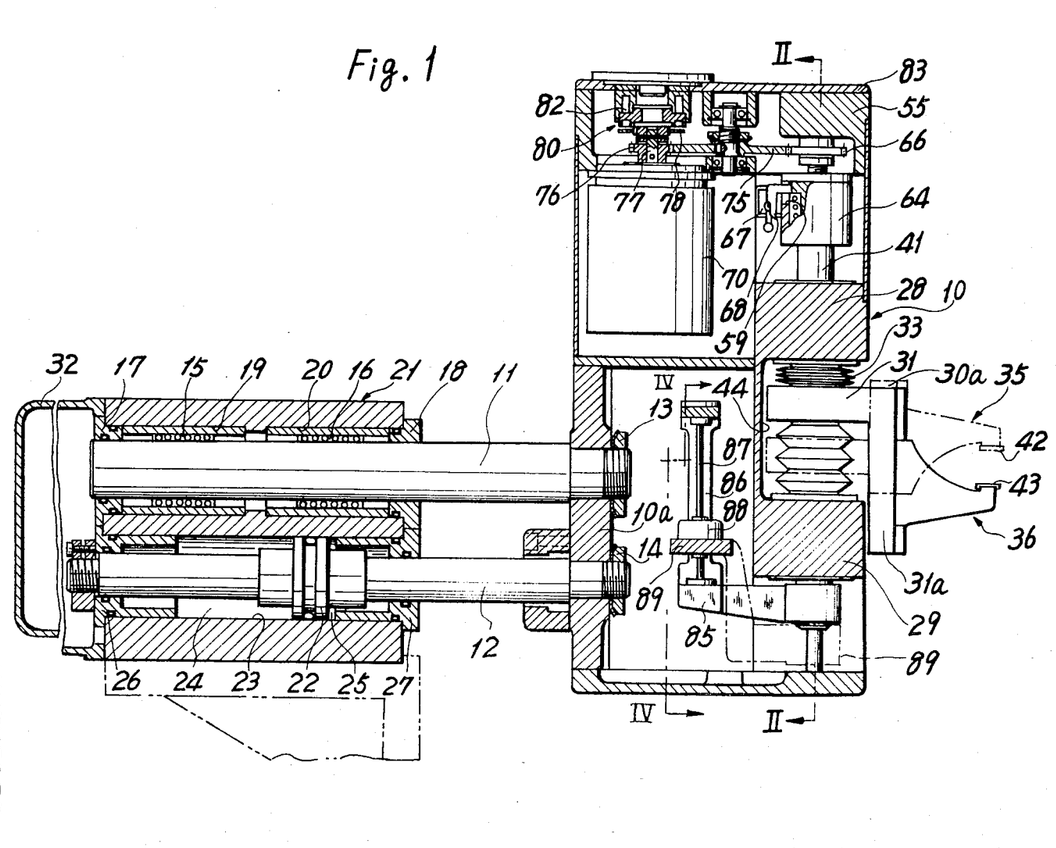
FIG. 1 is a longitudinal sectional view, showing a sizing device of the present invention, taken along the line I—I of FIG. 2.

As shown in FIG. 1, a sizing device according to the invention comprises a sizing head 10 which is secured to a guide rod 11 and to a piston rod 12 by means of nuts 13 and 14 on the rear wall portion 10a of the head. The guide rod 11 is slidably mounted in ball bearing bushings 15 and 16 which are axially fixed by flange members 17 and 18 in bores 19 and 20 respectively. The flange members 17 and 18 are secured to the outer ends of bores 19 and 20 formed in a bracket 21. A piston 22 is slidably received in an hydraulic cylinder 23 wherein cylinder chambers 24 and 25 are formed on both sides of piston 22 by cylinder caps 26 and 27 which are fixed to both ends of the cylinder 23. Each chamber is connected to fluid pressure source through a changeover valve (not shown). A rear cover 32 partially broken awaY is attached to the rear end of the bracket 21 to prevent dust and coolant from adhering to the guide rod 11 and the piston rod 12 by covering and enclosing the same.

On the front of the sizing head 10 are a pair of jaws 28 and 29 which form an open space 44 therebetween to movably receive a pair of carriages 30 and 31, which have measuring feelers 35 and 36 respectively. Feed rods 40 and 41 (as shown in FIG. 2 for said carriages) are slidably supported parallel to each other by ball bearing bushes 37 which are fixedly received in bores 38 and 39 in jaws 28 and 29 respectively.

Carriages 30 and 31 are fixed to feed rods 40 and 41 respectively, and are thus supported spaced apart so that they do not contact each other during their feed motion. The carriage 31 has a downwardly directed extension 31a (FIG. 1) which adjustably secures the measuring feeler 36 in a well known manner, such as by dovetail engagement. Similarly, the carriage 30 has an upwardly directed extension 30a which adjustably secures the measuring feeler 35. To the ends of the measuring feelers 35 and 36 are fixed small hard anvils 42 and 43 which lie in a vertical plane passing centrally between feed rods 40 and 41 as shown in FIGS. 2 and 3. During a grinding operation the anvils 42 and 43 are adapted to contact a workpiece (not shown) at positions on the workpiece diametrically opposed to each other. Since measuring feelers 35 and 36 are constructed so as to avoid interference with each other during movement except at their anvils 42 and 43, they are movable relatively over the entire height of the region defined by the open space 44 between the jaws 28 and 29. Numeral 33 shows a bellows which is effective to prevent grinding wheel granules and coolant from entering the head and adhering to the feed rods 40 and 41 by covering and enclosing the same.

Figure 2:
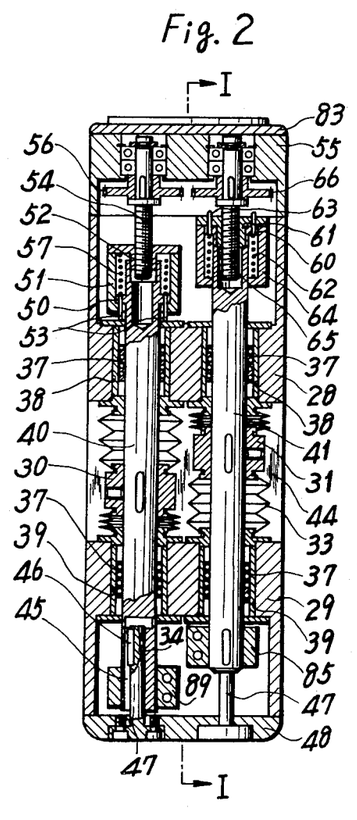
FIG. 2 is a sectional view taken along the line II—II of FIG. 1.
Figure 3:
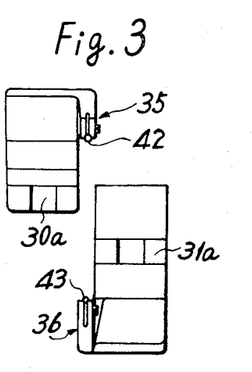
FIG. 3 is a fragmentary front view showing a pair of measuring feelers only and which are slidably supported on the sizing head by means of feed rods.

On the lower end of the feed rod 40, as shown in FIG. 2, a blind bore 34 is drilled to form a key slot 45 which is engaged with a key 46 attached to a stud 47. The stud 47 has a flange fixedly mounted on a bottom plate 48 of the sizing head 10 so as to restrain the feed rod 40 against rotation. Tee other feed rod 41 is restrained against rotation by a similar construction and key-engagement with like parts.

On the upper portion of feed rod 40 is formed a flange portion 50 which is received within a cylinder 51 having a female member 52. Pins 53 are secured to the flange portion 50 in such manner that they are in slidable engagement with the cylinder 51, so that the female member 52 is restrained against rotation by the aforementioned key engagement of the feed rod 40. A spring 57 is located between the female member 52 and the flange portion 50 to urge downwardly the feed rod 40. The female member 52 is threadedly engaged with a feed screw 54 which is rotatably mounted on an upper member 55. A gear 56 is keyed to the feed screw 54.

Similarly, on the upper portion of the feed rod 41, the feed mechanism is assembled by a flange portion 60 formed on the feed rod 41, a cylinder 64 having a female member 61, a feed screw 65 threadedly engaged with the female member 61, a spring 62, and pins 63 are secured to the flange portion 60. Pins 63 are in slidable engagement with the female member 61 to restrain it against rotation. A gear 66 is keyed to the feed screw 65. The spring 62 is located between the flange portion 60 and the cylinder 64 so as to urge upwardly the feed rod 41. Since feed screws 54 and 65 are of the same lead but counter-hand and are rotated in the same direction, the pair of feed rods 40 and 41 will be axially moved in opposite directions to each other by means of female members 52 and 61, cylinders 51 and 64, and springs 57 and 62.

The springs 57 and 62 permit cylinders 51 and 64 to move axially by a predetermined amount so that the force of the compressed springs renders a measuring pressure to the anvils 42 and 43, because the feed rod 40 having upper anvil 42 is urged downwardly by the spring 57 while the feed rod 41 having lower anvil 43 is urged upwardly by the spring 62.

A limit switch 67 (FIG. 1), is fixedly mounted on the cylinder 64 in such manner that the action-lever thereof engages with a dog 68 projected from the flange portion 60 through the slot 59 of cylinder 64 when the spring 62 is compressed by the predetermined amount. The limit switch 67 provides a signal to a source circuit (not shown) of a motor 70 to control operation of the motor.

Prior to measuring, feelers 35 and 36 are moved apart to enlarge the span therebetween so that anvils 42 and 43 will not collide with the workpiece when the sizing head 10 is advanced to the measuring position. In the measuring position the feelers 35 and 36 are moved toward one another to embrace the workpiece at diametrically opposite portions. After the sizing head 10 has been advanced to the measuring position, feelers 35 and 36 are moved toward the workpiece by the motor 70 through the agency of gearing, as described hereinafter, and then come into contact with the workpiece. Since feed screws 54 and 65 are rotated by the motor 70 till the signal is provided by the limit switch 67, the cylinder 51 is downwardly moved relative to the feed rod 40 to compress spring 57 while the cylinder 64 is upwardly moved relative to the feed rod 41 to compress the spring 62. When springs 57 and 62 are compressed by a predetermined amount in accordance with the displacements of the cylinders 51 and 64, the motor 70 is stopped by the signal transmitted from the limit switch 67 as described above. Thus, a predetermined measuring pressure is applied to the pair of anvils 42 and 43.

On the upper member 55 (FIG. 1), is rotatably mounted a gear 75 which is in meshing engagement with gears 56 and 66, and also meshingly engages a drive gear 76 secured to the shaft 77 of the motor 70. A magnet brake 80 comprises a magnet coil device 82 and a disc 78, which is secured to the upper end of the shaft 77. The magnet coil device 82 is fixed to a cover plate 83, which is mounted on the upper member 55, and in a well-known manner device 82 faces but is spaced from the brake disc 78 and serves to lock shaft 77 against rotation when it frictionally engages the brake disc 78. The magnet brake 80 is adapted to prevent changes of measuring pressure which might occur during rotation of feed screws 54 and 65 caused by undesirable vibrations after an optimum measuring pressure has been applied to feelers 35 and 36.

Figure 4:
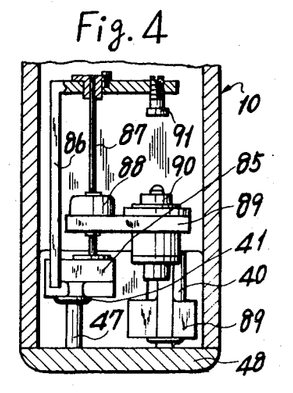
FIG. 4 is a fragmentary view taken along the line IV—IV of FIG. 1 and looking in the direction of the arrows.

FIG. 4 shows a construction of a device to measure a relative displacement between feelers 35 and 36, that is, the span therebetween. A bracket 85 is fixedly mounted on the lower portion of the feed rod 41, and securely holds an L-shaped holder 86 thereon. A magnetic scale 87 is secured to the bracket 85 at one end thereof, and is secured to the L-shaped holder 86 at the other end thereof. A flux-responsive multigap head assembly or reading head 88 is mounted on a bracket 89, which is mounted on the lower end of feed rod 40 in such manner that the reading head 88 is coaxial with the magnetic scale 87. The magnetic scale 87 and the reading head 88 are displaceable with respect to each other in accordance with the relative displacement of measuring feelers 35 and 36, and are well-known and commercially available as the MODEL MSS–101 and MSD 101 respectively of SONY PRECISION MAGNETIC SCALING SYSTEM manufactured by SONY corporation of Japan. A differential transformer 90 is fixedly mounted on the bracket 89. A stop 91 is adjustably fixed to the L-shaped holder 86 in such way that it engages with the core of the differential transformer 90 when feelers 35 and 36 are moved to the position nearly obtaining a maximum span therebetween.

Figure 5:
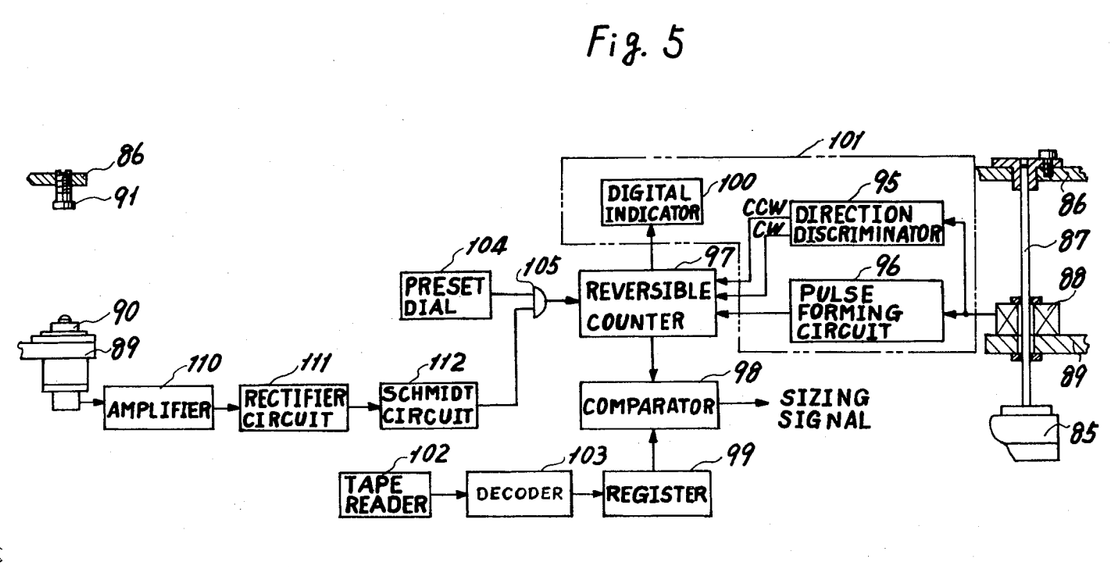
FIG. 5 is a schematic block diagram showing the various components of the control system for controlling the sizing operation.

In FIG. 5, the electric output from the reading head 88 is converted to pulse signals by a pulse-forming circuit 96 each time the reading head 88 detects a unit length represented by a periodically alternating reference magnetization on the magnetic scale 87. The reading head 88 also applies its electric output to a direction discriminator 95, which discriminates the directions of the movements of feelers 35 and 36 so as to control operations of a positive and a negative gate (not shown but SONY part). When the positive gate is operated, pulses transmitted from the pulse-forming circuit 96 are accumulated in a reversible counter 97. On the other hand, when the negative gate is operated, a countered binary number in the reversible counter 97 is subtracted by the pulses transmitted from the pulse-forming circuit 96. The positive gate is adapted to operate when the pair of feelers 35 and 36 are approaching each other and the negative gate is adapted to operate when the pair of feelers 35 and 36 are mutually moving apart.

Numeral 102 is a tape reader for reading information that stores a desired sizing signal, which information is discriminated by a decoder 103, and then is registered in a displacement register 99 for feelers 35 and 36. In a numerically controlled grinding machine, since orders punched on a tape can contain the information relating to the desired sizing signal together with distance, direction, said rate of movement of movable elements, it is not necessary to provide another reading device for reading the information relative to the sizing signal, which information also is capable of capable manually rendered to the register 99 through a presetting means with dial. Thus, the orders including the information relative to the desired sizing signal are presented consecutively to the tape reader which sets the displacement register 99 in accordance with the digital information on the tape. While the tape reader 102, the decoder 103, and the register 99 have been shown and described above in brief, it is to be understood that these components are well known to those skilled in the art being components of Fanuc Model 280 manufactured by Fujitsu Ltd., Kawasaki, Japan, said Fanuc Model 280 also controlling other operations of numerically controlled grinders. A comparator 98 is connected to the reversible counter 97 and to the register 99 so as to digitally compare the preset number with the countered number as described hereinafter in detail. An initial number preset in the reversible counter 97 is predetermined in accordance with the span between the pair of anvils 42 and 43, which span is defined by the initial locations of the anvils 42 and 43 so that feelers 35 and 36 are spread near to their maximum span. The dimension of the span is adapted to be absolutely and digitally indicated by an indicator 100. A presetting dial device 104 and a gate circuit 105 are adapted to preset the initial number to the reversible counter 97 as soon as the presetting signal is applied to the gate circuit 105. The presetting signal is generated through the well known Schmitt trigger circuit 112 and conventional amplifier 110 and rectifier 111 when the stop 91 (in FIG. 4) is engaged with the core of the differential transformer 90. The components 110, 111 and 112 are as contained in a conventional size indicator manufactured by Tokyo Seimitsu Ltd., of Tokyo Japan, and sold as Delta Model E–MD–P35C–2P.

The digital readout device 101, FIG. 5, comprises the direction discriminator 95, the pulse-forming circuit 96, and the indicator 100, which have not been shown and described in detail since they are available as the MODEL MSR–101 of SONY PRECISION MAGNETIC SCALING SYSTEM manufactured by SONY corporation of Japan.

Figure 6:
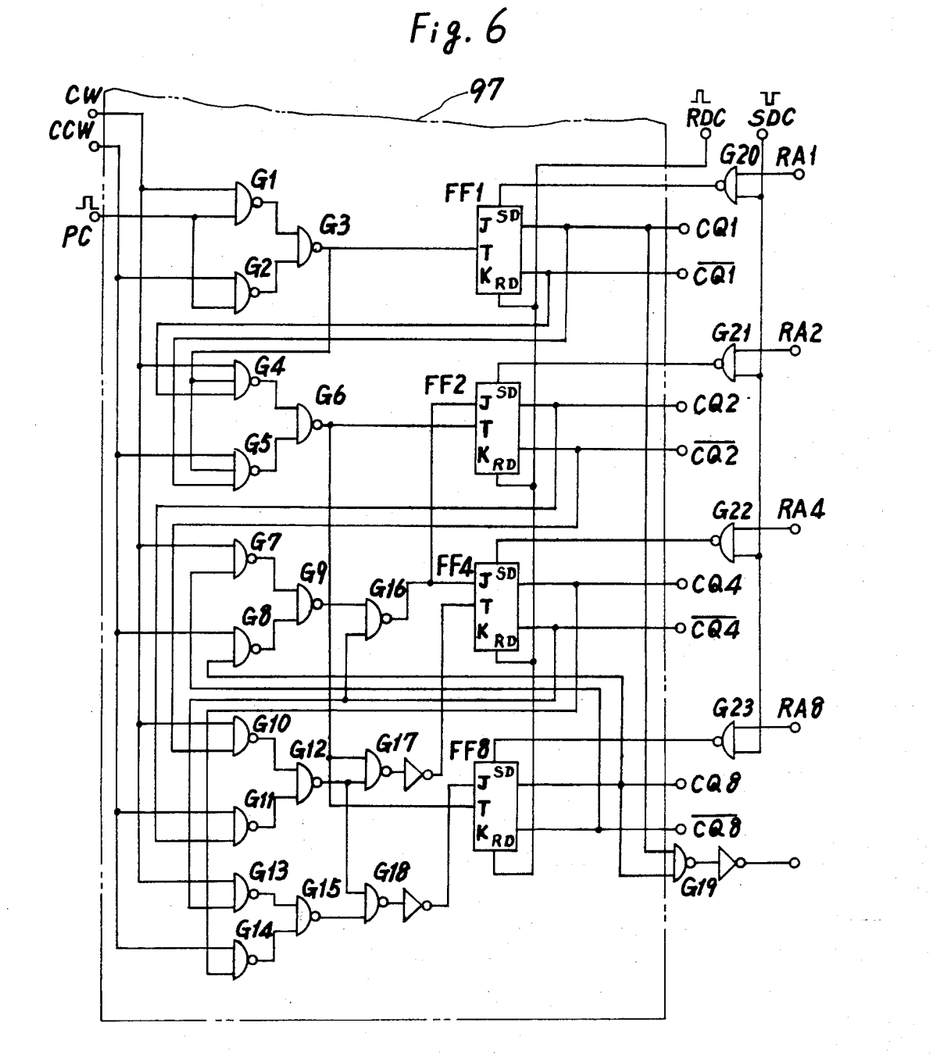
FIG. 6 is a block diagram showing a portion of the control system corresponding to a unit digit of the reversible counter.
Figure 7:
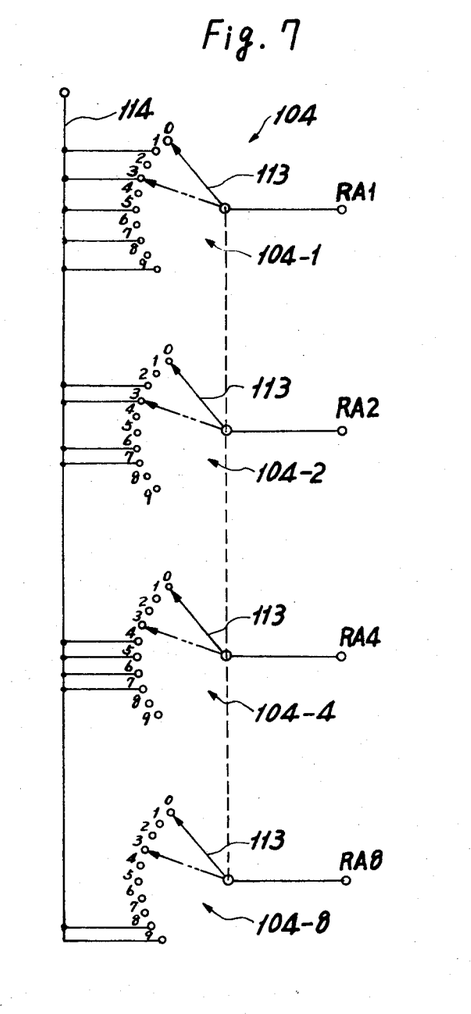
FIG. 7 is a schematic view showing a portion of the control system corresponding to a unit digit of the preset dial.
Figure 8:
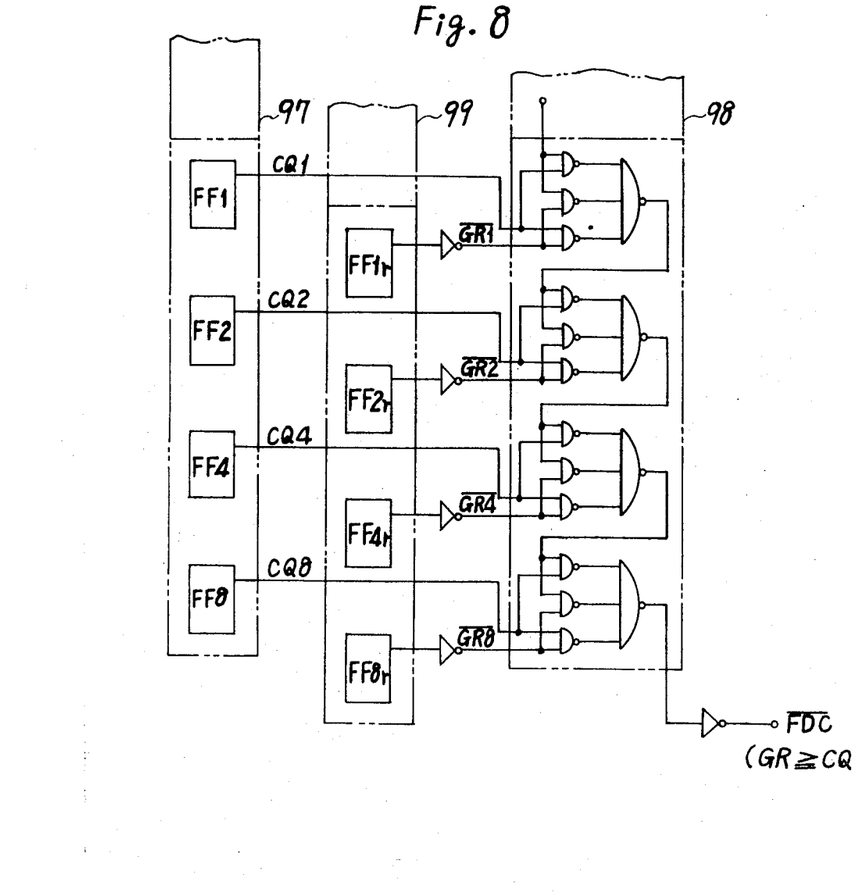
FIG. 8 is a block diagram showing a portion of the control system corresponding to a unit digit of the comparator.

Referring to FIGS. 6, 7 and 8, the electrical components 97, 98, 104 and 105, aforementioned with respect to FIG. 5, will be shown and described in detail hereafter. FIG. 6 shows a circuit construction for the units decade in a binary-coded decimal number which is a part of the reversible counter 97. In the preferred embodiment, since the reversible counter 97 consists of six decades from units decade to one hundred thousandth decade, its counter is constructed by six of the circuit-constructions, shown in FIG. 6, which are connected in series with each other. J-K flip-flops FF1, FF2, FF4, and FF8 render a calculating function to the circuit shown in FIG. 6, wherein output 1 appears at output terminal CQ1 or $\overline{CQ1}$ without the influence of signals applied to other input terminals if input 1 is applied to set terminal SD or reset terminal RD. In case J terminal is energized by a signal applied thereto, the output terminal CQ1 is turned on state 1 at first when a pulse is applied to T terminal. In case K terminal is energized by a signal applied thereto, the output terminal $\overline{CQ1}$ is turned on state 1 at first when the pulse is applied to the T terminal. In case the J and K terminals are energized by a signal applied thereto, the output pulse appears alternately at the output terminal CQ1 and the output terminal $\overline{CQ1}$ each time the pulse is applied to the T terminal. A further description of the J-K flip-flop circuit of FIG. 6 will not be given since such flip-flop circuits are well known to those skilled in the art but reference is made to "Logic Design with Integrated Circuits," by William E. Wickes and published by John Wiley and Sons, Inc.

Set terminals SD of the flip-flops are connected to output terminals RA1, RA2, RA4, and RA8 of the presetting dial device 104 through NAND gates G20, G21, G22, and G23 respectively which are characterized by a function whose output is 0 if and only if all inputs are 1. Reset terminals RD are connected to a common input terminal RDC. J, K, and T terminals are connected to positive and negative terminals CW and CCW of the direction discriminator 95, and to an input pulse terminal PC through NAND gates G1 to G18, inclusive.

The presetting dial device 104 is adapted to convert decimal digit to binary code. The schematic view shown in FIG. 7 is a part of the presetting dial device 104 which part comprises four groups 104-1, 104-2, 104-4, and 104-8 of contact points, each one of which groups consists of ten contact points, and four wipers 113 which are secured to a common shaft in the same angular position. For example, if the dial is set to an indicated decimal digit "3," each wiper 113 contacts with the third contact. Then, since an energized line 114 is connected to the contact points as shown in FIG. 7, output 1 appears at terminals RA1, and RA2, and does not appear at terminals RA4 and RA8, so that binary number 0011 (indicating decimal digit 3) is obtained. When the preset signal is applied to the reset terminal RDC, all J-K flip-flops are reset to state 0. Then, the binary coded decimal set by the preset dial 104 is preset through preset gates G20, G21, G22, and G23 which are opened by the set signal applied to the set terminal SDC. In case the decimal digit 3 is set by the preset dial 104, outputs 1 applied to terminals RA1 and RA2 turn on the output terminals CQ1 and CQ2 of flip-flops FF1 and FF2 to state 1 so that the binary coded decimal 0011 is preset as a decimal digit 3 at the units decade of the reversible counter 97.

The counting operation will be described hereunder in brief since its operation is well known to those skilled in the art. Provided that the pair of feelers 35 and 36 are approaching each other, the output 1 appears at the negative terminal CCW through the direction discriminator 95, and pulses from the pulse-forming circuit 96 are applied to pulse input terminal PC. A first pulse applied to the terminal PC turns off the output of gate G2 to zero, then the output of gate G3 being turned on state 1 whereby the flip-flop FF1 is shifted from state 1 to state 0 and the output pulse does not appear at the output terminal CQ1. Therefore, the first pulse subtracts 0001 from preset binary number 0011 to yield binary number 0010. The second pulse applied to the terminal PC shifts the flip-flop FF1 from the state 0 to state 1 to produce output 1 at the terminal CQ1. Then, since all inputs of the gate G5 are energized, the output of the gate G5 is shifted to zero whereby the flip-flop FF2 is shifted from the state 1 to state 0. Consequently, the countered binary number 0010 is further subtracted by the second pulse to yield binary number 0001. Thus, the preset binary number is continuously subtracted each time a pulse is applied to the terminal PC. in case the feelers 35 and 36 are opening, addition is ordered rather than subtraction because the terminal CW is energized by the signal from the direction discriminator 95.

The number countered at the reversible counter 97 is compared with the number registered at the register 99 through the agency of the comparator 98 as shown in FIG. 8. The comparator 98 comprises a plurality of NAND circuits interconnected as shown in FIG. 8, and as well known to those skilled in the art. Input terminals of the NAND circuits are connected to the output terminals CQ1, CQ2, CQ4, and CQ8 of the reversible counter 97 and to the output terminals $\overline{GR1}$, $\overline{GR2}$, $\overline{GR4}$, and $\overline{GR8}$ of flip-flops FF1r, FF2r, FF4r, and FF8r which constitute the register 99. Comparison is gradually performed between the countered number and the registered number from the one-thousandth digit of a decimal number to the hundredth digit. When the countered number accords with the registered number or becomes smaller than the registered number, that is $\overline{GR} = CQ$, a sizing signal appears at output terminal FDC.

Though the reversible counter 97, the presetting dial device 104, and the comparator 98 have been described above, for convenience sake, with respect only to a single logic circuit corresponding to one digit of a decimal number, in practice, it will be understood that they are constituted by combining a plurality of logic circuits similar to those described in accordance with the number of required digits.

The operation of the above described apparatus to measure workpieces will be further explained below. Prior to all sizing operations, the span between the pair of anvils 42 and 43 is accurately adjusted so that the dimension of the span may accord with the number digitally indicated on the indicator 100. When the pair of feelers 35 and 36 are extended near to a maximum span, the gate 105 is opened by the preset signal transmitted from the differential transformer 90 through amplifier 100, rectifier circuit 111, and the Schmitt trigger circuit 112. Then, the feelers 35 and 36 are stopped as soon as the signal is generated. Assume that the dimension of the span between the feelers is X millimeters. Number 0 preset by the presetting dial device 104 is transmitted to the reversible counter 97 through the opened gate 105, whereby the number 0 is preset to the reversible counter 97 and is digitally indicated on the indicator 100. Thereafter, the feelers 35 and 36 are moved to close till the anvils 42 and 43 contact with a master piece, for example, the master piece having 60.00 millimeters diameter, and a signal is generated at the limit switch 67 for stopping the feed motion of feelers 35 and 36, wherein the indicator 100 digitally indicates the differential in diameter, for example 90.000 millimeters between the span X and the 60.000 millimeters-diameter. Accordingly, the size of the span when the preset signal is generated, is defined as 150.000 millimeters, which is preset by the presetting dial device 104 as a standard size. Thus the number indicated on the indicator 100 is accurately accorded with the size of the span through the aforementioned operation.

During a sizing operation described below, it is assumed that a desired diameter of a workpiece to be ground is 100.000 millimeters, which is registered at the register 99. The sizing head 10 is advanced to the measuring position wherein the pair of anvils 42 and 43 are mutually approaching to embrace the workpiece, from a standard position, which is now defined as the position where the span between the pair of anvils 42 and 43 has the aforementioned standard size 150.000 millimeters. The number 150.000 indicated on the indicator 100 is subtracted in accordance with the reduction of the span, and simultaneously the current number counted in the reversible counter 97 as it is being subtracted from the standard size due to movement of the anvils is compared with 100.000 preset in the register 99. During the grinding operation, when the number in the reversible counter 97 accords with the number registered in the register 99, the comparator 98 generates the sizing signal which orders an end to the grinding operation. Then, the diameter of the workpiece has been finished to the desired size 100.000 millimeters. After the measuring, the pair of feelers 35 and 36 are moved back to the standard positions wherein the standard size is represet at the reversible counter 97. Thus, prior to the following sizing operations, since the relation between the size of the span and the indicated number is checked and corrected at the standard position each time one sizing operation is performed, miscounts generated in a sizing operation are prevented from accumulating to the following sizing operation.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A sizing device for measuring the diameter of a workpiece in a grinding machine, comprising, a sizing head, an actuator for moving said sizing head toward and away from the workpiece, a pair of feed rods slidably supported on said sizing head, feed means for moving said pair of feed rods simultaneously in opposite directions, a pair of measuring feelers secured to said feed rods respectively to be brought diametrically into contact with the workpiece so as to continuously measure the workpiece, a scale member mounted on one of said pair.

of said feed rods parallel thereto and calibrated by a periodically alternating reference magnetization which generates a magnetic flux, a reading device mounted on the other said pair of feed rods and responsive to variations in said magnetic flux for detecting the relative displacement of said measuring feelers, counting means for counting the instant diameter size of the workpiece in response to signals transmitted by said reading device, an indicator connected to said counting means for digitally indicating the instant diameter size of said workpiece, a register for registering a desired size, and comparator means connected to said register and said counting means for comparing the instant diameter size of said workpiece with said desired size and generating a sizing signal when the size of said workpiece as read on the indicator accords with said desired size as registered in said register.

2. The sizing device as claimed in claim 1, further comprising a stop mounted on one of said pair of feed rods, a detecting device actuated by said stop so as to produce a pre-set order when said measuring feelers are in a position near to their maximum distance apart prior to a following sizing operation, and a pre-setting device operative to set a predetermined size in said counting means when said pre-set order is applied thereto, whereby miscounts occuring in an earlier sizing operation are corrected and prevented from appearing or accumulating in following sizing operations.

3. The sizing device as claimed in claim 1, wherein a first carriage is secured to one of said pair of feed rods and having a downwardly directed extension thereon, and a second carriage is secured to the other of said pair of feed rods and having an upwardly directed extension thereon, said pair of measuring feelers including a lower feeler adjustably secured to said downwardly directed extension and an upper feeler adjustably secured to said upwardly directed extension, said upper and lower feelers being in a vertical plane passing centrally between said pair of feed rods to measure a span therebetween, said sizing head having jaws defining an open space therebetween for movably receiving said first and second carriages, and said reading device being coaxial with said scale member.

4. The sizing device as claimed in claim 3, further comprising a stop mounted on one of said pair of feed rods, a detecting device actuated by said stop so as to produce a preset order when said measuring feelers are in a position near to their maximum distance apart prior to a following sizing operation, and a pre-setting device operative to set a predetermined size in said counting means when said pre-set order is applied thereto.

* * * * *